UNITED STATES PATENT OFFICE.

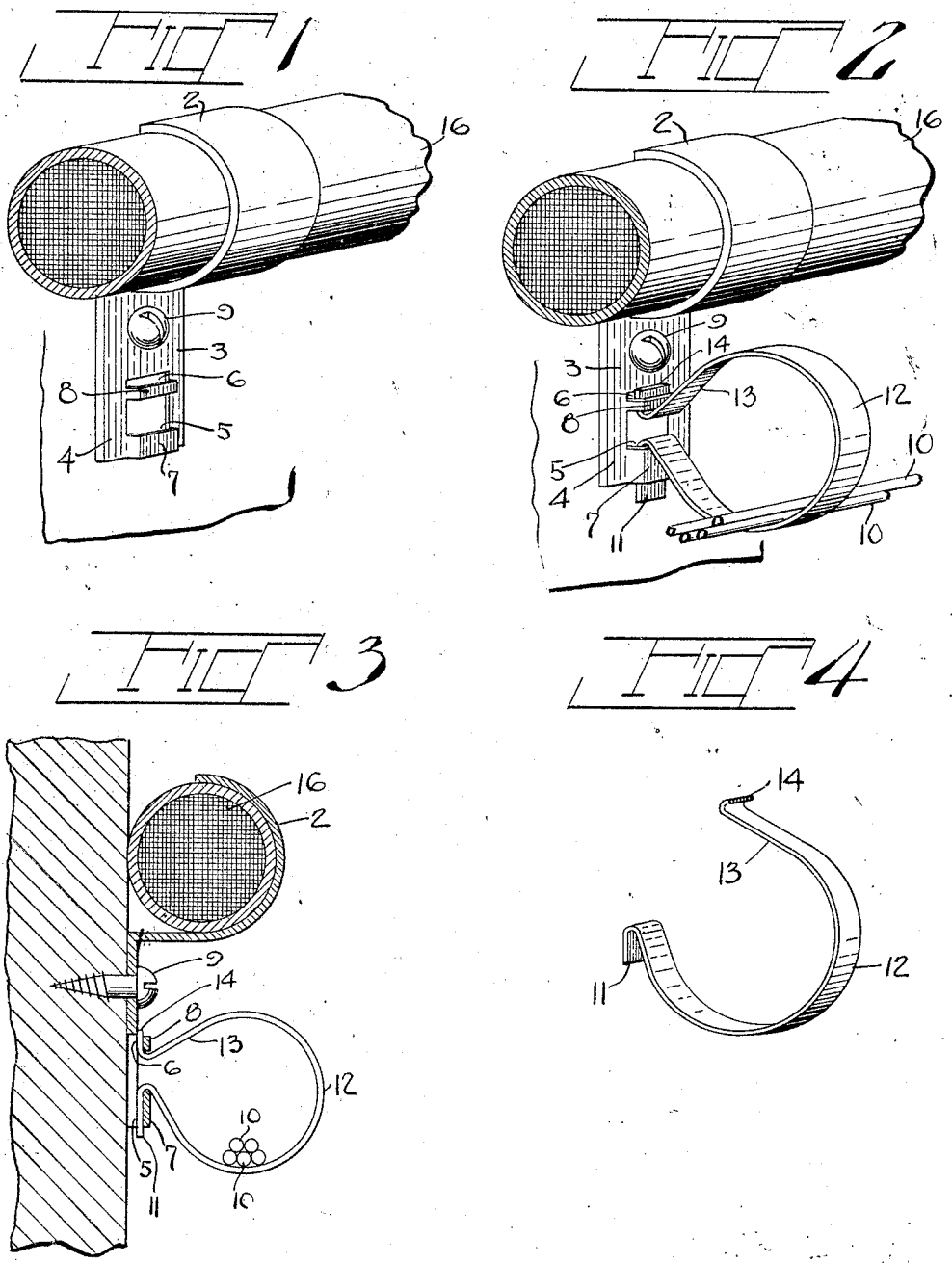

JOHN KARITZKY, OF GARWOOD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,616.      Specification of Letters Patent.      Patented Jan. 11, 1921.

Application filed January 23, 1920. Serial No. 353,614.

*To all whom it may concern:*

Be it known that I, JOHN KARITZKY, a citizen of the United States, residing at Garwood, in the county of Union and State of New Jersey, have invented certain new and useful Improvements in Conduit or Cable-Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with two sockets or recesses to receive both ends of a flat spring bridle ring. My invention further relates to such a conduit or cable clamp in which these two sockets or recesses are formed in the base of the clamp.

My invention further relates to the combination of such a conduit or cable clamp and a bridle ring to coöperate with it.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1 with the addition of a bridle ring formed from flat sheet metal;

Fig. 3 is a vertical section through the conduit or cable clamp shown in Fig. 2;

Fig. 4 is a perspective view of one form of bridle ring which I preferably employ.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. Preferably, though not necessarily, my conduit or cable clamp is formed of pressed sheet metal. On the lower portion 4 of the base 3 I form two sockets or recesses 5 and 6. These may be made in various ways. When the clamp is formed of pressed sheet material I preferably strike up a portion of the base 3 forming the straps or bearings 7 and 8 and cut away the metal between the straps or bearings. I also preferably, though not necessarily, cut away a little of the metal above the strap or bearing 8 as shown in Figs. 1 and 2. These straps or bearings form the pockets or recesses 5 and 6, which preferably are arranged beneath the securing screw 9.

Whenever it becomes necessary to increase the capacity of the installation by stringing bridle wires 10, 10 this can be easily done by hooking the hook 11 of the flat spring bridle ring 12 beneath the strap or bearing 7 so that it will rest in the pocket or recess 5. By then compressing the spring bridle ring and moving the end 13 toward the hook 11, the hook 14, on the other end of the bridle ring 12 will catch in the recess or pocket 6, under the strap or bearing 8, Fig. 2. It will be noted that the hooks 11 and 14 fit snugly in the sockets 5 and 6 respectively so that there is no rattling or movement between the cable clamp and the bridle ring after they have once been positioned. Moreover the bridle wires 10, 10 are completely inclosed and cannot work free of the bridle ring. In my invention the bridle ring 12 is positioned without disturbing the cable 16 or the screw 9.

Should it ever be desirable to remove the bridle wires 10, 10 and the bridle ring 12 this can easily be done by simply compressing the bridle ring sufficiently to free the hook from 14 from the socket or recess 6 and then lift the hook 11 from the socket or recess 5.

It will be noted that in my invention no tapping or screw threading of the conduit or cable clamp is required. This saves considerable labor and time in manufacture as well as reduces the amount of metal required in the cable clamp for such steps to be successfully performed. Nor does my bridle ring require to be screwthreaded, which still further reduces the cost of manufacture.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with two recesses or pockets to coöperate with a bridle ring.

2. A conduit or cable clamp provided with a hook portion and a base, the base being provided with a hole for a screw and with two recesses on the same side of the screw hole to coöperate with a bridle ring.

3. A conduit or cable clamp formed of sheet material provided with a hook portion and a base the clamp being provided with an opening and two straps to coöperate with the two ends of a bridle ring.

4. The combination of a conduit or cable clamp provided with a hook portion and a base, the base being provided with two straps to coöperate with a bridle ring, and a bridle ring having its two ends coöperating with the two straps.

5. The combination of a conduit or cable clamp formed of sheet material provided with a hook portion and a base the clamp being provided with an opening and two straps to coöperate with the two ends of a bridle ring, and a flat spring bridle ring having its two ends formed into hooks and coöperating with the straps of the base.

6. The combination in a conduit or cable clamp of locking surfaces to support a closed bridle ring in a vertical plane, a bridle ring having two ends and locking surfaces on each of the ends to coöperate with the locking surface on the conduit or cable clamp to hold the bridle ring immovable in a vertical plane one of the ends of the bridle ring being longer than the other.

7. A conduit and cable clamp having a hook portion and a heel portion, the heel portion being provided with two bearings or straps for both ends of a bridle ring, and a bridle ring coöperating with the bearings.

JOHN KARITZKY.

Witnesses:
F. W. KARITZKY,
W. A. HESSLER.